United States Patent
Schnieders

(10) Patent No.: US 12,028,767 B2
(45) Date of Patent: Jul. 2, 2024

(54) HANDOVER OF A LATENCY CRITICAL APPLICATION

(71) Applicant: Deutsche Telekom AG, Bonn (DE)

(72) Inventor: Dominik Schnieders, Aachen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 394 days.

(21) Appl. No.: 17/429,957

(22) PCT Filed: Feb. 13, 2020

(86) PCT No.: PCT/EP2020/053718
§ 371 (c)(1),
(2) Date: Aug. 11, 2021

(87) PCT Pub. No.: WO2020/165320
PCT Pub. Date: Aug. 20, 2020

(65) Prior Publication Data
US 2022/0132387 A1    Apr. 28, 2022

(30) Foreign Application Priority Data
Feb. 13, 2019   (EP) ..................... 19156933

(51) Int. Cl.
*H04W 36/22*   (2009.01)
*H04W 36/00*   (2009.01)
*H04W 36/32*   (2009.01)

(52) U.S. Cl.
CPC ....... *H04W 36/22* (2013.01); *H04W 36/0016* (2013.01); *H04W 36/32* (2013.01)

(58) Field of Classification Search
CPC ... H04W 36/0016; H04W 4/00; H04W 36/32; H04W 36/26; H04W 36/22; H04W 4/02; H04W 4/44
See application file for complete search history.

(56) References Cited

U.S. PATENT DOCUMENTS

2010/0214943 A1   8/2010   Immendorf et al.
2019/0208449 A1*  7/2019   Wang ..................... H04W 4/40
(Continued)

FOREIGN PATENT DOCUMENTS

WO   WO-2019011408 A1 *   1/2019   ........ H04W 36/0083
WO   WO 2019011408 A1     1/2019

OTHER PUBLICATIONS

"Mobile Edge Computing (MEC); End to End Mobility Aspects", ETSI Group Report, European Telecommunications Standards Institute (ETSI), vol. MEC, No. V1 .1.1 Oct. 18, 2017 (Oct. 18, 2017), pp. 1-52, XP014301471 (Year: 2017).*

(Continued)

*Primary Examiner* — Mehmood B. Khan
(74) *Attorney, Agent, or Firm* — LEYDIG, VOIT & MAYER, LTD.

(57) ABSTRACT

A method includes: a) provisioning, at a selected edge computing system, at least one latency critical application; b) determining, at a first base station, that an end user device is located proximate to an edge of the first cell and/or in an overlapping area of the first cell and a second cell of the wireless network; c) checking a degree of capacity utilization of the second cell; d) scheduling a handover of the end user device from the first cell to the second cell in case that the second cell has sufficient available capacity; e) transferring, before executing the handover, in real time a first note about the scheduled handover from a first scheduler associated with the first base station to the at least one latency critical application; and f) executing the handover.

6 Claims, 1 Drawing Sheet

(56) References Cited

U.S. PATENT DOCUMENTS

2019/0268812 A1\* 8/2019 Li ................... H04W 36/0077
2019/0306766 A1\* 10/2019 Ketyko ................ H04L 41/147

OTHER PUBLICATIONS

ETSI, "Mobile Edge Computing (MEC); End to End Mobility Aspects", ETSI Group Report, Oct. 18, 2017, pp. 1-52, vol. MEC., No. V1.1.1, European Telecommunications Standards Institute, Sophia-Antipolis, France, XP014301471.

\* cited by examiner

HANDOVER OF A LATENCY CRITICAL APPLICATION

CROSS-REFERENCE TO PRIOR APPLICATIONS

This application is a U.S. National Phase application under 35 U.S.C. § 371 of International Application No. PCT/EP2020/053718, filed on Feb. 13, 2020, and claims benefit to European Patent Application No. EP 19156933.4, filed on Feb. 13, 2019. The International Application was published in English on Aug. 20, 2020 as WO 2020/165320 A1 under PCT Article 21(2).

FIELD

The disclosure relates to computer networks, particularly to wireless networks, particularly to mobile networks and, more specifically, to a handover of a latency critical application provided within one of those networks.

BACKGROUND

A network services exchange provider may employ a communication facility, such as a data center, in which multiple customers of the provider locate network, server, and storage gear and interconnect to a variety of telecommunications and other network service provider(s). Data centers may be shared by the multiple tenants having their networking equipment located within the data centers.

With Information Technology (IT) and communications facilities in safe, secure hands, telecommunications, Internet, application service providers, cloud service providers, content providers, and other providers, as well as enterprises, enjoy less latency and the freedom to focus on their core business. Additionally, customers may reduce their traffic back-haul costs and free up their internal networks for other uses.

However, there are some scenarios being realized by server based latency critical applications which require data processing near a respective end user.

Autonomous vehicles, for example, will generate a lot of data. Much of this data will be unstructured and will need to be run through powerful analytics programs to produce actionable data with any value to businesses. Edge computing architectures will help to prioritize what data needs to remain on the edge to be processed by the vehicle's onboard computing power or by any computing device nearby the vehicle and what data should be relayed back to data centers for analysis. Edge data centers will serve a critical role in this network, functioning as a relay station and providing extra computing power for mission critical analytics that need to remain near end users.

In an autonomous vehicle, even a few milliseconds of delay can result in an accident and catastrophic loss of life. The stakes are simply too high to allow the vehicles' networks to be plagued by lag. Self-driving cars need to react immediately to changing road conditions; they cannot simply come to a stop while waiting for instructions or recommendations from a distant cloud server analyzing data.

Edge computing can offer a solution to this problem. In fact, the heavy investment in autonomous vehicle research has been one of the reasons so many tech companies are pushing to improve and expand their edge computing architectures. By co-locating servers and computing resources in versatile edge facilities located in both high traffic areas and more far-flung areas with limited bandwidth access, companies can ensure that their autonomous vehicles are able to access the data they need with minimal latency to make decisions quickly. As Internet of Things (IoT) devices, self-driving cars also have the ability to make their own decisions without relying on guidance from servers located in distant data centers.

A further example scenario is given by computer games which experience lag when connecting to a central server and latency could mean the difference between victory and defeat.

Edge computing is not a new concept, but several trends have come together to create an opportunity to turn massive amounts of machine-based data into actionable intelligence closer to the source of the data. Typical edge computing devices typically reside away from a centralize computing available in a cloud.

Edge computing enables analytics and data gathering to occur at or nearby the source of the data. The role of edge computing to date has mostly been used to ingest, store, filter, and send data to cloud systems. Meanwhile, it is also desirable, that edge computing systems are packing more compute, storage, and analytic power to consume and act on the data nearby the end user location.

There are some scenarios where it is useful to bring server based applications closer to terminals, i.e. user equipment (UE) and, thus, to acquire a reduced latency with respect to roundtrip-time (RTT). Specifically, MNOs (Mobile Network Operators) undertake efforts to integrate edge computing in their networks.

However, it is still quite difficult or even impossible to provide latency critical applications via a wireless interface, i.e. a radio interface as currently used schedulers operate according to a best effort and fair schedule approach when allocating the available resources on the wireless interface, i.e. at a respective base station, which leads to an inacceptable variance in latency and jitter for any latency critical application.

SUMMARY

In an exemplary embodiment, the present invention provides a method. The method includes: a) provisioning, at a selected edge computing system of a plurality of edge computing systems within a wireless network, at least one latency critical application which is to be provided to an end user device in a first cell of the wireless network via a first base station located proximate to the selected edge computing system; b) determining, at the first base station, that the end user device is located proximate to an edge of the first cell and/or in an overlapping area of the first cell and a second cell of the wireless network, wherein the second cell is served by a second base station; c) checking a degree of capacity utilization of the second cell, wherein the second cell is located proximate to the first cell and designated for a potential handover of the end user device from the first cell to the second cell; d) scheduling a handover of the end user device from the first cell to the second cell in case that the second cell has sufficient available capacity; e) transferring, before executing the handover, in real time a first note about the scheduled handover from a first scheduler associated with the first base station to the at least one latency critical application; and f) executing the handover.

BRIEF DESCRIPTION OF DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
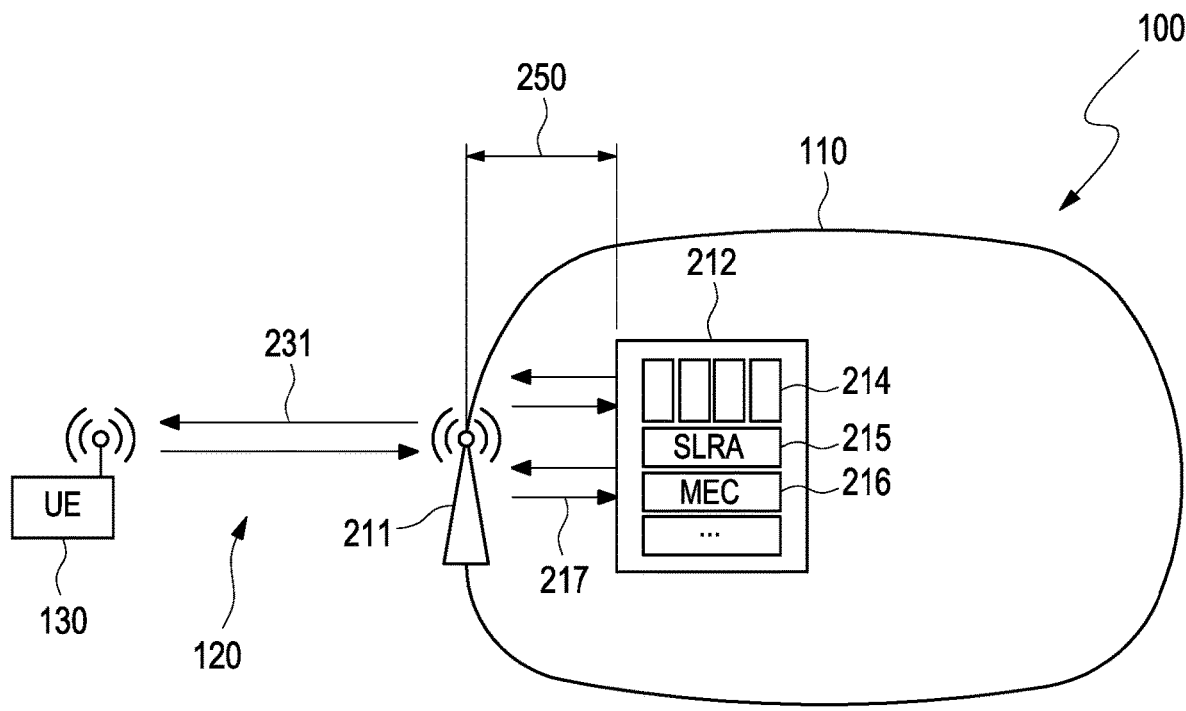
FIG. 1 is a schematic diagram illustrating schematically a data transfer between a user equipment, a base station and an edge computing system in accordance with an exemplary embodiment.

A parallel patent application titled "real time adaption of a latency critical application" provides a possibility to determine in real time for each of one or more latency critical applications which are to be provided via a wireless interface a respective operating point while simultaneously optimizing the resource use on the wireless interface. Exemplary embodiments of the present disclosure provide a manner of dealing with latency critical applications which are to be provided via a wireless interface in a cell which is used to capacity and/or in an upcoming handover.

Generally, resource use and route optimization suffers from handover delays derived from a signaling message exchange. Handover latency plays an important role in the performance of a network scenario, particularly in matters of latency critical applications. Handover latency may result in packet losses and severe end-to-end performance degradation.

In an exemplary embodiments, a method is provided. The method includes:
a) provisioning at a selected edge computing system of a plurality of edge computing systems within a wireless network at least one latency critical application which is to be provided to an end user device in a first cell via a first base station serving the first cell and being located nearby the selected edge computing system,
b) determining at the first base station that the end user device is located nearby an edge of the first cell and/or in an overlapping area of the first cell and a second cell and/or between the first cell and the second cell,
c) checking a degree of capacity utilization of the second cell which is served by a second base station and located nearby the first cell and designated for a potential handover of the end user device from the first cell to the second cell,
d) scheduling a handover of the end user device from the first cell to the second cell in case that the second cell has sufficient available capacity,
e) transferring, before executing the handover, in real time a first note about the scheduled handover from the first base station to the at least one latency critical application hosted by the selected edge computing system,
f) executing the handover.

Generally, within a full cell, i.e. a cell which is used to capacity, available resources, i.e. resource blocks, resource elements, are distributed up to now among all connected end user devices according to a "proportional fair" algorithm. This may lead to a reduced data throughput and/or an increased latency for any application which is to be provided to any of the different connected end user devices. In case of latency critical applications, this may result in a degradation of the performance.

A handover of an end user device between two cells typically leads to significantly higher latencies, several 10 ms to several 100 ms, which generally leads with latency critical applications to a bad user experience.

In both cases, the latency critical application does not operate correctly or is even interrupted.

In view of these disadvantages, a method in an exemplary embodiment of the present disclosure specifically schedules and executes a handover by taking into account the attendant circumstances, thus allowing the at least one latency critical application to be prepared for the handover and attenuating the above mentioned disadvantages for the at least one latency critical application.

Step a) may comprise that a first scheduler associated with the first base station receives from the at least one latency critical application hosted by the selected edge computing system operation requirements of the at least one latency critical application.

It is also possible that the at least one latency critical application is hosted/provisioned directly by the end user device. In this case the first note is sent from the first scheduler to the end user device, i. e. to the at least one latency critical application hosted by the end user device.

According to an exemplary embodiment, it is provided to generate and transfer, before executing the scheduled handover, in real time an attribute and/or a note about the scheduled handover from the first base station, particularly from the first scheduler associated with the first base station, to the at least one latency critical application hosted by the selected edge computing system.

According to one embodiment, the first scheduler associated with the first base station communicates with the at least one latency critical application hosted by the selected edge computing system via a service layer radio application (SLRA) which is implemented on both the first base station, particularly the first scheduler, and the selected edge computing system.

Accordingly, it is provided in step e) that the first scheduler associated with the first base station transfers the first note via the service layer radio application to the at least one latency critical application hosted by the selected edge computing system.

According to one embodiment, the first note comprises at least the following parameters: event of the scheduled handover, lead time (Tv) between scheduling the handover and executing the handover, expected duration of the handover.

The lead time Tv may constitute 0 to some milliseconds (0–x ms, with x being an integer value).

The expected duration of the handover may constitute some milliseconds (y ms, with y being an integer value).

Optionally, the first note may comprise further parameters.

According to still a further embodiment, step e) further comprises:
e') receiving the first note by the at least one latency critical application hosted by the selected edge computing system, and
e'') transferring, in reaction to the scheduled handover, a second note from the at least one latency critical application hosted by the selected edge computing system to the first scheduler associated with the first base station via the service layer radio application, the second note comprising parameters about a strategy of the at least one latency critical application hosted by the selected edge computing system in order to adapt the at least one latency critical application to the scheduled handover.

In the case that the application is hosted by the end user device, i.e., the application is a client-based application, all notes are transferred directly between the first scheduler and the end user device, preferably also using SLRA which is implemented on both the first base station and the end user device.

The second note may announce a change of operating point of the at least one latency critical application, i.e. put at least one operating point up for selection (by the scheduler), targeting at least one of the following strategy actions:
operating point with long enough latency to overcome handover time, i.e. duration of the handover,
operating point that allows pre-buffering of data at the end user device and/or at the selected edge computing system before the handover takes place in order to overcome handover time,
operating point with interruption of data transfer ("no data transfer") during the scheduled handover.

The at least one latency critical application can specifically apply one or more strategies in order to be prepared for the scheduled handover, i.e. to adapt itself to the scheduled handover.

Thus, the at least one latency critical application can schedule a change of operating point, i.e. a change from a current operating point to an operating point which is still acceptable for a good performance of the at least one latency critical application and simultaneously adapted to an increased latency and/or a decreased data throughput as possible implications of the scheduled handover.

Further, the at least one latency critical application can provide a pre-buffering of data on the end user device (UE) and/or on the selected edge computing system or on any further remote data storage (as far as this is an option for the at least one application). The second note to the scheduler would comprise the change to the respective operating point that represents the enhanced throughput for the pre-buffering of data, as well as a minimum duration time in the operating point in order to complete the pre-buffering. Such pre-buffering of data can be performed in awareness of quality reduction, leading, however, to a compensation of the undesired effect of the unique high latency during the handover. Further, the at least one latency critical application could envisage an interruption of data transfer during the scheduled handover. The second note to the scheduler would comprise the change to the respective operating point that represents "no data transfer".

Further, the at least one latency critical application can interrupt the data transfer while the handover is going on. This might be important as data packets can be queued at different positions, namely application, deeper protocol stacks, base station, etc., when the data throughput is reduced or even set to zero. Such undesired queuing leads to additional latency as the queue has to be removed first when the handover is terminated. Generally, old data packets are rejected for real time/latency critical applications anyway. Insofar the latency is reduced when the data are transferred not at all during the handover but already rejected at the data source. This is again comprised in the second note by changing to the respective operating point with no transmission of data.

Transmission is to be understood within the scope of the present disclosure in a broad sense, particularly as data transmission, i.e. as a transfer of data (a digital bitstream or a digitized analog signal) over a communication channel, such channels can be copper wires, optical fibers, wireless communication channels, storage media and computer buses. In the present disclosure, particularly wireless communication channels are considered.

Data can be represented as electromagnetic signals, such as radio waves, microwaves, an electrical voltage or infrared signal. Data can be represented as packets, frames, bits, information considering all different communication layers.

After completed handover, the latency critical application can pass over to its standard/normal operation/operating modus/point.

Regarding the starting situation that the latency critical application is situated in a full cell, i. e. the first cell is used to capacity, this means a very high capacity utilization of available resource blocks/elements. Further the end user device of the latency critical application is placed at an edge or nearby an edge of the first cell and/or in an overlapping area of the first cell and a second cell and/or between the first cell and the second cell.

Referring to such a scenario, according to a further embodiment, step b) is specified as
b') determining at the first base station that the first cell is used to capacity, and step f) is specified as
f') executing an early and immediate handover of the end user device from the first cell to the second cell in case that the second cell has a capacity utilization less than the first cell.

Further step f) comprises:
f') allocating, by the second base station, to the at least one latency critical application available resources from the second cell in consideration of current operation requirements of the at least one latency critical application.

Within the second (new) cell of a respective second base station it is possible to allocate to the latency critical application more resources (resource blocks/elements) due to the lesser capacity utilization of the second cell. Thus, the situation/performance of the latency critical application is enhanced. Furthermore, the first cell of the first base station is unburdened due to the early handover. Thus, all other end user devices/applications served/provided via the first base station can be supplied with more resources.

In the first place, the first scheduler associated with the first base station has the information that the application for the end user device is a latency critical application. Such information is exchanged between the at least one application and the first scheduler via SLRA which is implemented on both the first base station and the selected edge computing system hosting the latency critical application.

An advantage of exemplary embodiments of the present disclosure is that the operation conditions for the latency critical application as well as for the other applications provided within the first cell are enhanced due to the fact that the handover was brought forward.

Further, the latency critical application can specifically react to a scheduled handover when being informed, as suggested by exemplary embodiments, before the handover is executed. Thus, the effects of the latency accompanying the handover can be mitigated or even compensated.

Thus, the effect/influence caused by the latency of the handover for the latency critical application when using a wireless network, such as a mobile network, can be reduced. Therefore, an introduction and usage of latency critical applications within a wireless network, such as a mobile network, become more realistic.

The present disclosure also refers to a system comprising at least:

a plurality of edge computing systems each located nearby at least one respective base station of a wireless network and deployed and managed by a network provider, wherein at least one of the plurality of edge computing systems is configured to be selected to provision at least one latency critical application which is to be provided to an end user device within a first cell of the network via a first base station located nearby the selected edge computing system and serving the first cell, the first base station located nearby the selected edge computing system, wherein the selected edge computing system is configured to provision the at least one latency critical application and an application programming interface (API) endpoint for communication with the first base station, wherein the selected edge computing system is configured to exchange with a first scheduler associated with the first base station transmission specific data in real time using a service layer radio application (SLRA), which is implemented on both the first base station and the selected edge computing system, via the API endpoint and to use those data for scheduling and executing a handover of the end user device from the first cell to a second cell taking into account strategy actions for adapting in real time the at least one latency critical application to the handover.

It is also possible that the at least one latency critical application is hosted/provisioned directly by the end user device. In this case the first note is sent from the first scheduler to the end user device, i. e. to the at least one latency critical application hosted by the end user device. In the case that the application is hosted by the end user device all notes are transferred directly between first scheduler and end user device, preferably also using SLRA which is implemented on both the first base station and the end user device. In this case the system comprises the end user device, instead of or additionally to the plurality of edge computing systems.

A system according to an exemplary embodiment is particularly configured to execute at least one embodiment of the above described method.

Further, a non-transitory computer readable storage medium is provided which comprises instructions that when executed cause one or more processors of a wireless network to:
- A) provision at a selected edge computing system of a plurality of edge computing systems within a wireless network, particularly a mobile network, at least one latency critical application which is to be provided to an end user device in a first cell of the wireless network via a first base station located nearby the selected edge computing system,
- B) determine at the first base station that the end user device is located nearby an edge of the first cell and/or in an overlapping area of the first cell and a second cell of the wireless network and/or between the first cell and the second cell,
- C) check a degree of capacity utilization of the second cell which is served by a second base station and located nearby the first cell and designated for a potential handover of the end user device from the first cell to the second cell,
- D) schedule a handover of the end user device from the first cell to the second cell in case that the second cell has sufficient available capacity,
- E) transfer, before executing the handover, in real time a note about the scheduled handover from the first base station to the at least one latency critical application hosted by the selected edge computing system,
- F) execute the handover.

The computer readable storage medium particularly comprises instructions that when executed cause one or more processors of the wireless network, particularly the mobile network, to execute at least one embodiment of a method disclosed herein.

The details of one or more examples of exemplary embodiments are set forth in the accompanying drawings and the description below. Other features, objects, and advantages of exemplary embodiments will be apparent from the description and drawings, and from the claims.

FIG. 1 is a schematic diagram illustrating an example system 100 incorporating a system according to an exemplary embodiment. The system 100 comprises a network 110 of a mobile network operator (MNO), an access layer 120 and an end user device 130 which can access the mobile network 110 via the access layer 120. Further, the device 130 can access the Internet via the access layer 120 and the mobile network 110 and, thus, benefit from all services provided by or via the Internet.

The mobile network 110 comprises a plurality of access nodes 211, such as a MSAN (Multi-Service Access Node) and/or a cell tower (an antenna support with mobile antennas), a plurality of edge computing systems 212 and a backbone interconnecting the mobile network 110 with the Internet.

A mobile network operator (MNO), also known as a wireless service provider is a provider of wireless communications services that owns or controls all the elements necessary to sell and deliver services to an end user device including radio spectrum allocation, wireless network infrastructure, back haul infrastructure, provisioning computer systems, etc.

In general, edge devices are normally routers that provide authenticated access (most commonly Point-to-Point Protocol over Asynchronous Transfer Mode (PPPoA) and Point-to-Point Protocol over Ethernet (PPPoE)) to faster, more efficient backbone and core networks. The edge computing systems 212 provided according to the present disclosure are made smart, so that the edge computing systems 212 are not only routers, but can include Quality of Service (QoS) and multi-service functions to manage different types of traffic and to provision applications, particularly latency critical applications. Each of the plurality of edge computing systems 212 is located nearby at least one base station 211 and, thus, nearby a scheduler associated with the at least one respective base station 211. Due to the physical proximity of each of the edge computing systems 212 to at least one respective base station 211, information between the edge computing systems 212 and the respective schedulers associated with the neighboring base stations 211 can be transferred in real time. This enables the scheduler associated with a respective base station 211 to allocate in real time available resources to applications which are provisioned by the respective neighboring edge computing systems 212.

Considering a latency critical application which is to be provided to an end user device (user equipment UE) 130, the latency critical application is provisioned by a selected edge computing system 212 which is nearby the base station 211 serving the end user device 130. The scheduler associated with the base station 211 is provided in real time via the selected edge computing system 212 with input parameters when allocating resources to the latency critical application. Such input parameters are, for example, "channel condition", "historical throughput", "packet delay", "queue length" and further context sensitive parameters of the latency critical application, such as mean latency, maximum latency and data rate which are currently needed by the latency critical application. As those parameters are provided in real time, the scheduler can consider dynamically requirements of the application which change with time. Thus, the scheduler only blocks resources which are necessary for fulfilling the current requirements of the application in real time. An optimal usage of the spectrum is reached while the latency requirements of the latency critical application are fulfilled at any time.

FIG. 1 shows schematically a data transfer between the user equipment 130, the base station 211 and the edge computing system 212 which is located nearby the base station 211. The user equipment 130 is currently served by the base station 211 because the user equipment 130 is currently positioned within a coverage area of a cell which is served by the base station 211. Thus, data are transferred between the user equipment 130 and the base station 211 as indicated by double arrow 231. Applications which are desired by the user equipment 130 have to be provided via the base station 211. A scheduler associated with the base station 211 has to allocate available resources to all applications and services which are running via the base station 211. In the case that the user equipment 130 is to be provided, for example on demand, with a latency critical application, the edge computing system 212 is selected as that edge computing system that is located most nearby the base station 211, as indicated by double arrow 250, for that the selected edge computing system 212 provisions the latency critical application 214. The selected edge computing system 212 comprises further a service layer radio application (SLRA) 215 and a computing unit, i.e. a mobile edge computing unit 216.

Multi-access Edge Computing (MEC), formerly Mobile Edge Computing, is a network architecture concept that enables cloud computing capabilities and an IT service environment at the edge of the mobile network 110. The basic idea behind MEC is that by running applications and performing related processing tasks closer to the user equipment 130, network congestion is reduced and applications perform better. MEC technology is implemented at the selected edge computing system 212, and enables flexible and rapid deployment of the latency critical application for the user equipment 130. The selected edge computing system 212 is realized as a cloudlet and is logically connected, as indicated by double arrow 217, with the scheduler associated with the base station 211 via the service layer radio application 215 which is implemented on both the selected edge computing system 212 and the base station 211. Via the service layer radio application 215, the scheduler receives in real time context sensitive parameters of the latency critical application 214, such as currently needed mean latency, currently needed maximum latency and currently needed data rate. Thus, the scheduler of the base station 211 can consider those context sensitive data when dynamically allocating resources to the latency critical application 214. Therefore, at any time, an optimal usage of the spectrum is reached while latency requirements are simultaneously fulfilled.

Regarding the starting situation that the user equipment 130 is located at the edge of the cell of the network 110 which is served by the base station 211, and/or in an overlapping area of this cell and a second neighboring cell of the network 110 and/or between this cell and the second cell, a handover of the user equipment 130 from the (first) cell to the second cell is envisaged. The handover is scheduled in good time so that before executing the scheduled handover, an attribute and/or a first note about the scheduled handover is generated and transferred from the base station 211, particularly from the scheduler associated with the base station 211, to the at least one latency critical application 214 hosted by the selected edge computing system 212. The scheduler 218 (see FIG. 2) associated with the base station 211 communicates with the at least one latency critical application 214 hosted by the selected edge computing system 212 via the service layer radio application (SLRA) which is implemented on both the base station 211 and the selected edge computing system 212 as indicated by reference numbers 215 and 219, respectively (see FIG. 2).

Accordingly, it is provided that the scheduler 218 associated with the base station 211 transfers the first note via the service layer radio application 219, 215 to the at least one latency critical application 214 hosted by the selected edge computing system 212 as indicated by double arrow 217.

The first note may comprise at least the following parameters: event of the scheduled handover, lead time (Tv) between scheduling the handover and executing the handover, expected duration of the handover.

The lead time Tv may constitute 0 to some milliseconds (0–x ms, with x being a positive integer value).

The expected duration of the handover may constitute some milliseconds (y ms, with y being an integer value).

Optionally, the first note may comprise further parameters.

It is now possible that the at least one latency critical application 214 generates and transfers a second note to the scheduler 218 associated with the base station 211 in reaction to the scheduled handover via the service layer radio application 215, 219, the second note comprising parameters about a strategy of the at least one latency critical application 214 hosted by the selected edge computing system 212 in order to adapt the at least one latency critical application 214 to the scheduled handover.

The second note may announce a change of operating point of the at least one latency critical application targeting at least one of the following strategy actions:
   operating point of the at least one latency critical application 214 with long enough latency to overcome handover time, i.e. the duration of the handover,
   operating point that allows pre-buffering of data at the end user device 130 and/or at the selected edge computing system 212 before the handover takes place in order to overcome handover time,
   operating point with interruption of data transfer ("no data transfer") during the scheduled handover.

The at least one latency critical application 214 can specifically apply one or more strategies in order to be prepared for the scheduled handover, i.e. to adapt itself to the scheduled handover.

Thus, the at least one latency critical application 214 can schedule a change of operating point, i.e. a change from a current operating point to an operating point which is still acceptable for a good performance of the at least one latency critical application and simultaneously adapted to an increased latency and/or a decreased data throughput as possible implications of the scheduled handover.

Further, the at least one latency critical application 214 can provide a pre-buffering of data on the end user device (UE) 130 or on the selected edge computing system 212 or on any further remote data storage (as far as this is an option for the at least one application). Such pre-buffering of data can be performed in awareness of quality reduction, leading, however, to a compensation of the undesired effect of the unique high latency.

Further, the at least one latency critical application 214 can interrupt the data transfer while the handover is going on. This might be important as data packets can be queued at different positions, namely application, deeper protocol stacks, base station, etc., when the data throughput is reduced or even set to zero. Such undesired queuing leads to additional latency as the queue has to be removed first when the handover is terminated. Generally, old data packets are rejected for real time/latency critical applications anyway. Insofar the latency is reduced when the data are transferred not at all during the handover but already rejected at the data source.

After completion of the handover, the at least one latency critical application 214 can pass over to its standard/normal operation/operating modus/operating point.

In the case that the at least one latency critical application 214, i.e. the user equipment 130 being provided with the at least one latency critical application is situated in a full cell of the wireless network 110, i.e. the cell is used to capacity, and the user equipment 130 is located at or nearby the edge of the cell, it is envisaged to schedule and execute an early handover compared to a regular handover in order to disburden the full cell and to provide the possibility to allocate more resources to the at least one latency critical application 214. However, for this purpose, it is determined at first whether the second cell has more free capacity than the (first) cell.

Figure 2:
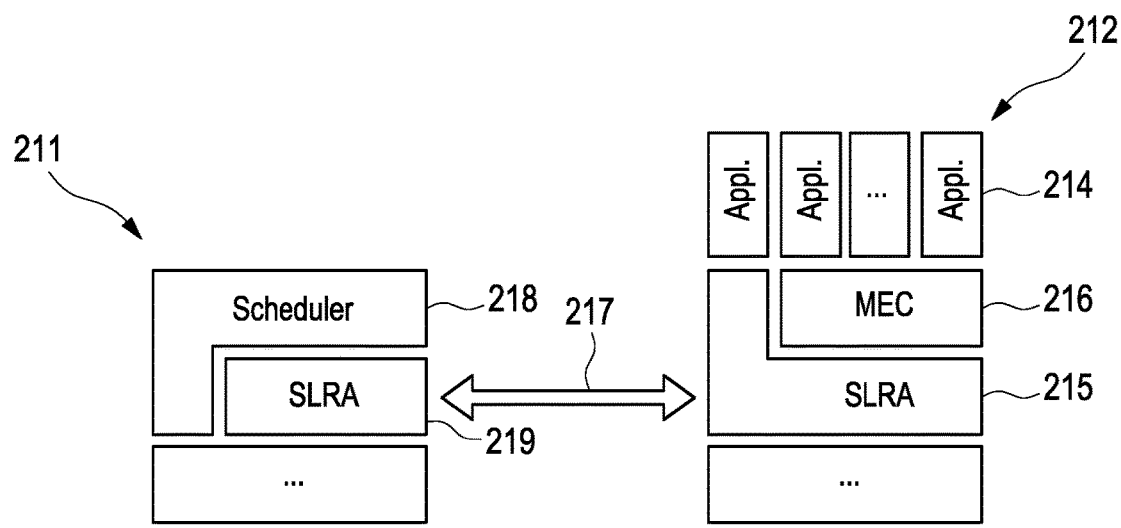
FIG. 2 is a more detailed view of a base station and a selected edge computing system and a logical connection between the base station and the selected edge computing system in accordance with an exemplary embodiment.

FIG. 2 is a still more detailed view of the base station 211 and the selected edge computing system 212 and the logical connection 217 between the base station 211 and the selected edge computing system 212 in accordance with techniques described herein. The base station 211 comprises a scheduler 218 and a service layer radio application (SLRA) 219. The logical connection 217 between the base station 211 and the selected edge computing system 212 is realized via the SLRA 215 of the selected edge computing system 212 and the SLRA 219 of the base station 211.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 system
110 wireless network
120 access layer
130 end user device
211 access node, base station
212 edge computing system
214 latency critical application
215 service layer radio application
216 mobile edge computing unit
217 logical connection
218 first scheduler
219 service layer radio application
231 data transfer
250 double arrow

The invention claimed is:

1. A method, comprising:
a) provisioning, at a selected edge computing system of a plurality of edge computing systems within a wireless network, at least one latency critical application which is to be provided to an end user device in a first cell of the wireless network via a first base station located proximate to the selected edge computing system, wherein a first scheduler associated with the first base station receives, from the at least one latency critical application, operation requirements of the at least one latency critical application, wherein the first scheduler communicates with the at least one latency critical application via a service layer radio application which is implemented on both the first base station and the selected edge computing system;
b) determining, at the first base station, that the end user device is located proximate to an edge of the first cell and/or in an overlapping area of the first cell and a second cell of the wireless network, wherein the second cell is served by a second base station;
c) checking a degree of capacity utilization of the second cell, wherein the second cell is located proximate to the first cell and designated for a potential handover of the end user device from the first cell to the second cell;
d) scheduling a handover of the end user device from the first cell to the second cell in case that the second cell has sufficient available capacity;
e) transferring, before executing the handover, in real time a first note about the scheduled handover from the first scheduler to the at least one latency critical application, wherein the first scheduler transfers the first note about the scheduled handover via the service layer radio application to the at least one latency critical application;
f) receiving, by the at least one latency critical application, the first note, and transferring a second note from the at least one latency critical application to the first scheduler in response to the scheduled handover via the service layer radio application, the second note comprising parameters about a strategy of the at least one latency critical application in order to adapt the at least one latency critical application to the scheduled handover; and
g) executing the handover;

wherein the second note announces a change in a manner of operation of the at least one latency critical application to provide for at least one of the following:
  a long enough latency to overcome handover time;
  pre-buffering of data at the end user device and/or at the selected edge computing system before the handover takes place in order to overcome handover time; or
  interruption of data transfer during the scheduled handover.

2. The method according to claim 1, wherein the first note comprises at least the following parameters: event of the scheduled handover, lead time (Tv) between scheduling the handover and executing the handover, and expected duration of the handover.

3. The method according to claim 1, wherein step b) further comprises:
  b') determining, at the first base station, that no capacity is left within the first cell; and
  wherein step h) comprises:
  h') executing the handover based on the second cell having a capacity utilization less than the first cell.

4. The method according to claim 1, wherein step h) comprises:
  h") allocating, by the second base station, to the at least one latency critical application, available resources from the second cell in consideration of current operation requirements of the at least one latency critical application.

5. A system, comprising:
  a plurality of edge computing systems within a wireless network; and
  a first base station;
  wherein a selected edge computing system of the plurality of edge computing systems and the first base station are is-configured to facilitate performance of the following:
  a) provisioning, at the selected edge computing system, at least one latency critical application which is to be provided to an end user device in a first cell of the wireless network via the first base station, wherein the first base station is located proximate to the selected edge computing system, wherein a first scheduler associated with the first base station receives, from the at least one latency critical application, operation requirements of the at least one latency critical application, wherein the first scheduler communicates with the at least one latency critical application via a service layer radio application which is implemented on both the first base station and the selected edge computing system;
  b) determining, at the first base station, that the end user device is located proximate to an edge of the first cell and/or in an overlapping area of the first cell and a second cell of the wireless network, wherein the second cell is served by a second base station;
  c) checking a degree of capacity utilization of the second cell, wherein the second cell is located proximate to the first cell and designated for a potential handover of the end user device from the first cell to the second cell;
  d) scheduling a handover of the end user device from the first cell to the second cell in case that the second cell has sufficient available capacity;
  e) transferring, before executing the handover, in real time a first note about the scheduled handover from the first scheduler to the at least one latency critical application, wherein the first scheduler transfers the first note about the scheduled handover via the service layer radio application to the at least one latency critical application;
  f) receiving, by the at least one latency critical application, the first note, and transferring a second note from the at least one latency critical application to the first scheduler in response to the scheduled handover via the service layer radio application, the second note comprising parameters about a strategy of the at least one latency critical application in order to adapt the at least one latency critical application to the scheduled handover; and
  g) executing the handover;
  wherein the second note announces a change in a manner of operation of the at least one latency critical application to provide for at least one of the following:
  a long enough latency to overcome handover time;
  pre-buffering of data at the end user device and/or at the selected edge computing system before the handover takes place in order to overcome handover time; or
  interruption of data transfer during the scheduled handover.

6. A non-transitory computer-readable storage medium having processor-executable instructions stored thereon, wherein the processor-executable instructions, when executed by one or more processors, facilitate:
  A) provisioning, at a selected edge computing system of a plurality of edge computing systems within a wireless network, at least one latency critical application which is to be provided to an end user device in a first cell of the wireless network via a first base station located proximate to the selected edge computing system, wherein a first scheduler associated with the first base station receives, from the at least one latency critical application, operation requirements of the at least one latency critical application, wherein the first scheduler communicates with the at least one latency critical application via a service layer radio application which is implemented on both the first base station and the selected edge computing system;
  B) determining, at the first base station, that the end user device is located proximate to an edge of the first cell and/or in an overlapping area of the first cell and a second cell of the wireless network, wherein the second cell is served by a second base station;
  C) checking a degree of capacity utilization of the second cell and located proximate to the first cell and designated for a potential handover of the end user device from the first cell to the second cell;
  D) scheduling a handover of the end user device from the first cell to the second cell in case that the second cell has sufficient available capacity;
  E) transferring, before executing the handover, in real time a first note about the scheduled handover from the first scheduler to the at least one latency critical application, wherein the first scheduler transfers the first note about the scheduled handover via the service layer radio application to the at least one latency critical application;
  F) receiving, by the at least one latency critical application, the first note, and transferring a second note from the at least one latency critical application to the first scheduler in response to the scheduled handover via the service layer radio application, the second note comprising parameters about a strategy of the at least one latency critical application in order to adapt the at least one latency critical application to the scheduled handover; and
G) executing the handover;
wherein the second note announces a change in a manner of operation of the at least one latency critical application to provide for at least one of the following:
a long enough latency to overcome handover time;
pre-buffering of data at the end user device and/or at the selected edge computing system before the handover takes place in order to overcome handover time; or
interruption of data transfer during the scheduled handover.

* * * * *